United States Patent
De et al.

(10) Patent No.: US 11,848,793 B2
(45) Date of Patent: Dec. 19, 2023

(54) EXPRESSING MULTICAST GROUPS USING WEAVE TRAITS

(71) Applicant: Google LLC, Mountain View, CA (US)

(72) Inventors: Pradip S. De, Fremont, CA (US); Jay Dare Logue, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/042,520

(22) PCT Filed: Aug. 25, 2020

(86) PCT No.: PCT/US2020/047812
§ 371 (c)(1),
(2) Date: Feb. 22, 2023

(87) PCT Pub. No.: WO2022/046037
PCT Pub. Date: Mar. 3, 2022

(65) Prior Publication Data
US 2023/0336371 A1    Oct. 19, 2023

(51) Int. Cl.
*G06F 15/16* (2006.01)
*H04L 12/18* (2006.01)
*H04W 84/18* (2009.01)

(52) U.S. Cl.
CPC ........... *H04L 12/185* (2013.01); *H04W 84/18* (2013.01)

(58) Field of Classification Search
CPC .................................................... H04L 12/185
USPC .......................................................... 709/245
See application file for complete search history.

(56) References Cited

U.S. PATENT DOCUMENTS

| | | | | |
|---|---|---|---|---|
| 7,301,957 B2* | 11/2007 | Lee | ........................ | H04W 8/12 370/395.31 |
| 7,996,526 B2* | 8/2011 | Woundy | ................ | H04L 69/329 709/224 |
| 8,451,845 B2* | 5/2013 | Boucadair | ............. | H04L 61/251 370/393 |
| 9,154,993 B1* | 10/2015 | Breau | .................... | H04W 40/02 |
| 11,240,200 B1* | 2/2022 | Vasquez | .................. | H04L 9/006 |

(Continued)

FOREIGN PATENT DOCUMENTS

WO    2022046037    3/2022

OTHER PUBLICATIONS

"International Preliminary Report on Patentability", Application No. PCT/US2020/047812, dated Feb. 28, 2023, 9 pages.

(Continued)

*Primary Examiner* — Moustafa M Meky
(74) *Attorney, Agent, or Firm* — Colby Nipper PLLC

(57) ABSTRACT

Techniques and devices for expressing multicast groups using Weave traits are described for generating a multicast address in which a wireless network device receives an application group identifier and hashes the application group identifier to generate a group identifier. The wireless network device concatenates a global identifier and a Weave fabric identifier, inserts the concatenated global identifier and the Weave fabric identifier into a network prefix field of a destination address and inserts the group identifier into a group identifier field of the destination address. The wireless network device sets the value of a plen field of the destination address to a value that indicates a length of the Weave fabric identifier and inserts the destination address into an Internet Protocol version 6 data packet.

20 Claims, 9 Drawing Sheets

(56) References Cited

U.S. PATENT DOCUMENTS

| | | | | |
|---|---|---|---|---|
| 2006/0209833 A1* | 9/2006 | Yoneyama | ............ | H04W 40/24 |
| | | | | 370/392 |
| 2006/0256716 A1* | 11/2006 | Caci | ........................ | H04L 49/90 |
| | | | | 370/535 |
| 2009/0146833 A1* | 6/2009 | Lee | ........................ | H04L 69/16 |
| | | | | 340/9.13 |
| 2010/0265869 A1* | 10/2010 | Sarikaya | ............. | H04L 12/1836 |
| | | | | 370/312 |
| 2011/0110375 A1* | 5/2011 | Boucadair | ............. | H04L 61/251 |
| | | | | 370/393 |
| 2014/0376405 A1* | 12/2014 | Erickson | ............... | H04L 9/3263 |
| | | | | 370/254 |
| 2015/0098457 A1* | 4/2015 | Mahendran | ......... | H04W 40/246 |
| | | | | 370/338 |
| 2019/0159006 A1 | 5/2019 | Turon | | |
| 2022/0191310 A1* | 6/2022 | Xie | ........................ | H04L 69/161 |

OTHER PUBLICATIONS

"International Search Report and Written Opinion", Application No. PCT/US2020/047812, dated Apr. 26, 2021, 14 pages.

"Weave Architecture Overview", Retrieved at: https://openweave.io/documents/weave-architecture.pdf, Dec. 31, 2017, 24 pages.

Haberman, et al., "Unicast-Prefix-based IPv6 Mullticast Addresses", Aug. 1, 2002, 7 pages.

* cited by examiner

EXPRESSING MULTICAST GROUPS USING WEAVE TRAITS

RELATED APPLICATION(S)

This application is a national stage entry of International Application No. PCT/US2020/047812, filed Aug. 25, 2020, the disclosure of which is incorporated herein by reference in its entirety.

BACKGROUND

Using wireless networking to connect devices to each other, and to cloud-based services, is increasingly popular for sensing environmental conditions, controlling equipment, and providing information and alerts to users. Many devices on wireless networks are designed to operate for extended periods of time on battery-power which limits the available computing, user interface, and radio resources in the devices. Many devices and applications on wireless networks utilize multicast communications to efficiently communicate information that is published by one node and subscribed to by other nodes in the network.

Additionally, some applications in a wireless network device may use multicast communications to publish information to, and/or subscribe to information from, other devices or services that work together in an application group to provide functionality in a home area network. To publish or subscribe to information, each device in the application group needs to possess a multicast address for that application group. However, there are opportunities to improve the efficiency of distributing multicast group addresses to nodes in the wireless network that are members of an application group.

SUMMARY

This summary is provided to introduce simplified concepts of expressing multicast groups using Weave traits, generally related to generating multicast address for application group communication. The simplified concepts are further described below in the Detailed Description. This summary is not intended to identify essential features of the claimed subject matter, nor is it intended for use in determining the scope of the claimed subject matter.

In aspects, methods, devices, systems, and means for expressing multicast groups using Weave traits are described for generating a multicast address in which a wireless network device receives an application group identifier and hashes the application group identifier to generate a group identifier. The wireless network device concatenates a global identifier and a Weave fabric identifier, inserts the concatenated global identifier and the Weave fabric identifier into a network prefix field of a destination address, and inserts the group identifier into a group identifier field of the destination address. The wireless network device sets the value of a plen field of the destination address to a value that indicates a length of the Weave fabric identifier and inserts the destination address into an Internet Protocol version 6 (IPv6) data packet. The wireless network device sends the IPv6 data packet over a Weave network, the sending being effective to direct one or more other wireless network devices in the Weave network to perform an operation based on the contents of the IPv6 data packet.

In aspects, methods, devices, systems, and means for expressing multicast groups using Weave traits are described for filtering a multicast address in which a wireless network device receives an application group identifier and hashes the application group identifier to generate a group identifier. The wireless network device receives an Internet Protocol version 6 (IPv6) data packet including a multicast address over a Weave network and compares a value in a group identifier field to the generated group identifier to determine if the value in a group identifier field equals the generated group identifier. Based on the determining that the group identifier field equals the generated group identifier, the wireless network device sends contents of a data field of the IPv6 data packet to an application in the wireless network device, the sending causing the application to direct the wireless network device to perform an operation.

The details of one or more implementations are set forth in the accompanying drawings and the following description. Other features and advantages will be apparent from the description and drawings and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

Aspects of expressing multicast groups using Weave traits are described with reference to the following drawings. The same numbers are used throughout the drawings to reference like features and components.

DETAILED DESCRIPTION

This document describes techniques and devices to simplify multicast addressing for applications in nodes of a Weave network. When an application in a Weave-enabled node wants to address a multicast group of nodes, the node needs to construct a multicast address for that group of nodes. Similarly, when an application intends to listen on a multicast communication channel, the node needs to construct the appropriate multicast address to join that multicast channel. The application would benefit from using a high-level, abstract construct that provides a mapping to a multicast address to simplify constructing or joining a multicast group.

In a Weave network, a Weave schema provides a mechanism to formally express various states and properties of physical and virtual resources via an abstract construct called a trait (Weave trait). In aspects, an application communication (multicast) group can be expressed using a Weave trait. The node can subsequently map the trait into a multicast address at an Internet Protocol (IP) layer of the Weave network stack in the node. The node can then use the resulting multicast address to communicate (e.g., publish or subscribe) with other nodes that are members of that application group. By using a Weave trait to map to a multicast address for an application group, sharing and referencing multicast addresses for application groups is simplified for the application by mapping Weave traits to the multicast addresses using the data model of the Weave schema that the application already uses to emit and/or receive data in the Weave network.

For example, a sender node needs to multicast a Weave Data Management (WDM) event to a group of recipients in an application group as a WDM notification. The recipient nodes would subscribe to a corresponding group trait for the application group. The Weave stack in each recipient node converts a group trait into a multicast group identifier and constructs a multicast address to join by using a fabric prefix for the Weave network. The sender node, on the other hand, confirms to the Weave stack, using an appropriate Application Programming Interface (API) that the sender node needs to use the group trait for disseminating the WDM event. The Weave stack in the sender node utilizes the mapping of the group trait to construct the same multicast address (as the recipient nodes constructed) to use to send the WDM event over the Weave network to the recipient nodes in the application communication group.

Example Environment

Figure 1:
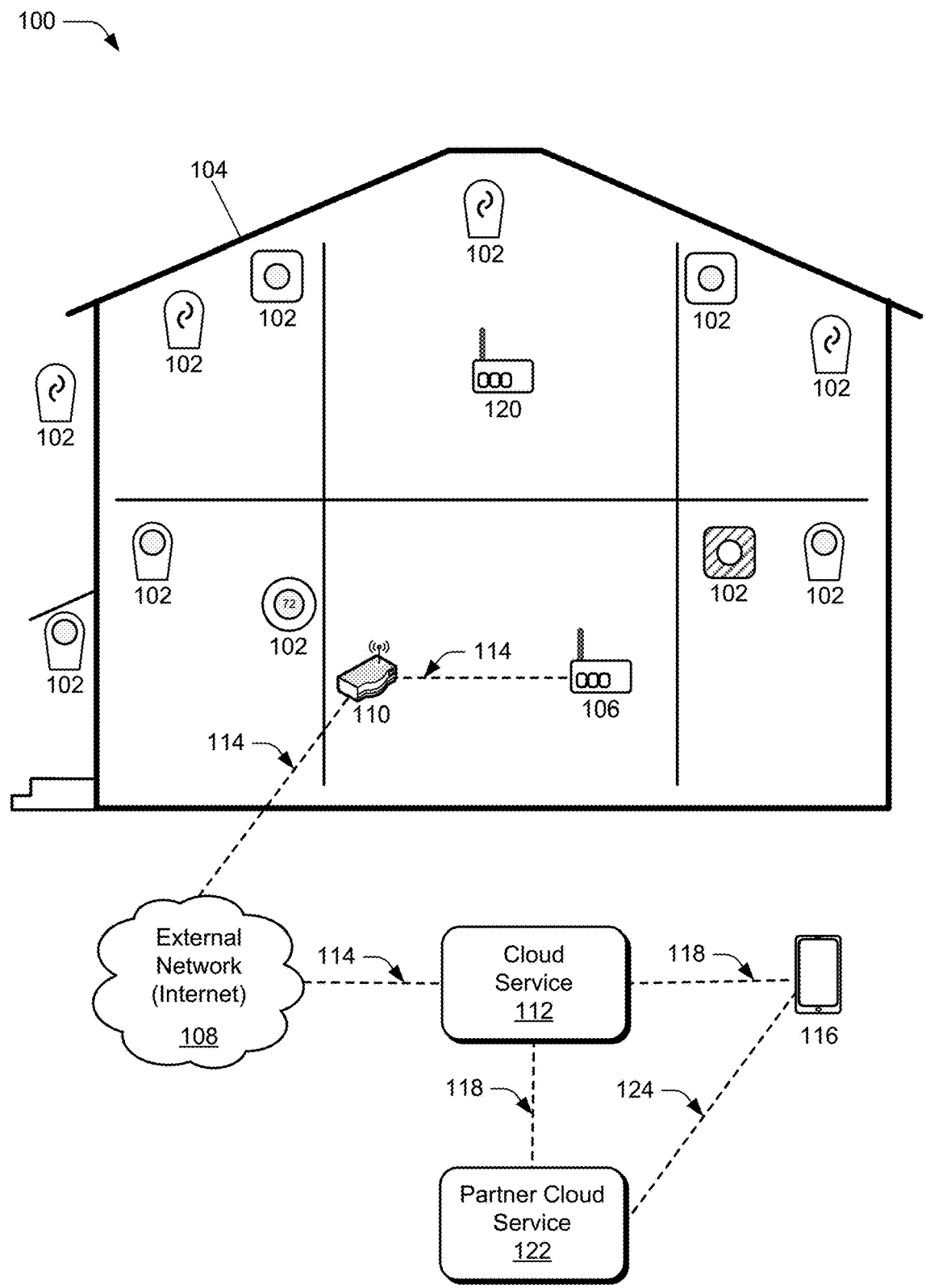
FIG. 1 illustrates an example network environment in which various aspects of expressing multicast groups using Weave traits can be implemented.

FIG. 1 illustrates an example network environment 100 in which aspects of expressing multicast groups using Weave traits can be implemented. The network environment 100 includes a home area network (HAN) such as a HAN 200, described below with respect to FIG. 2. The HAN includes wireless network devices 102 that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
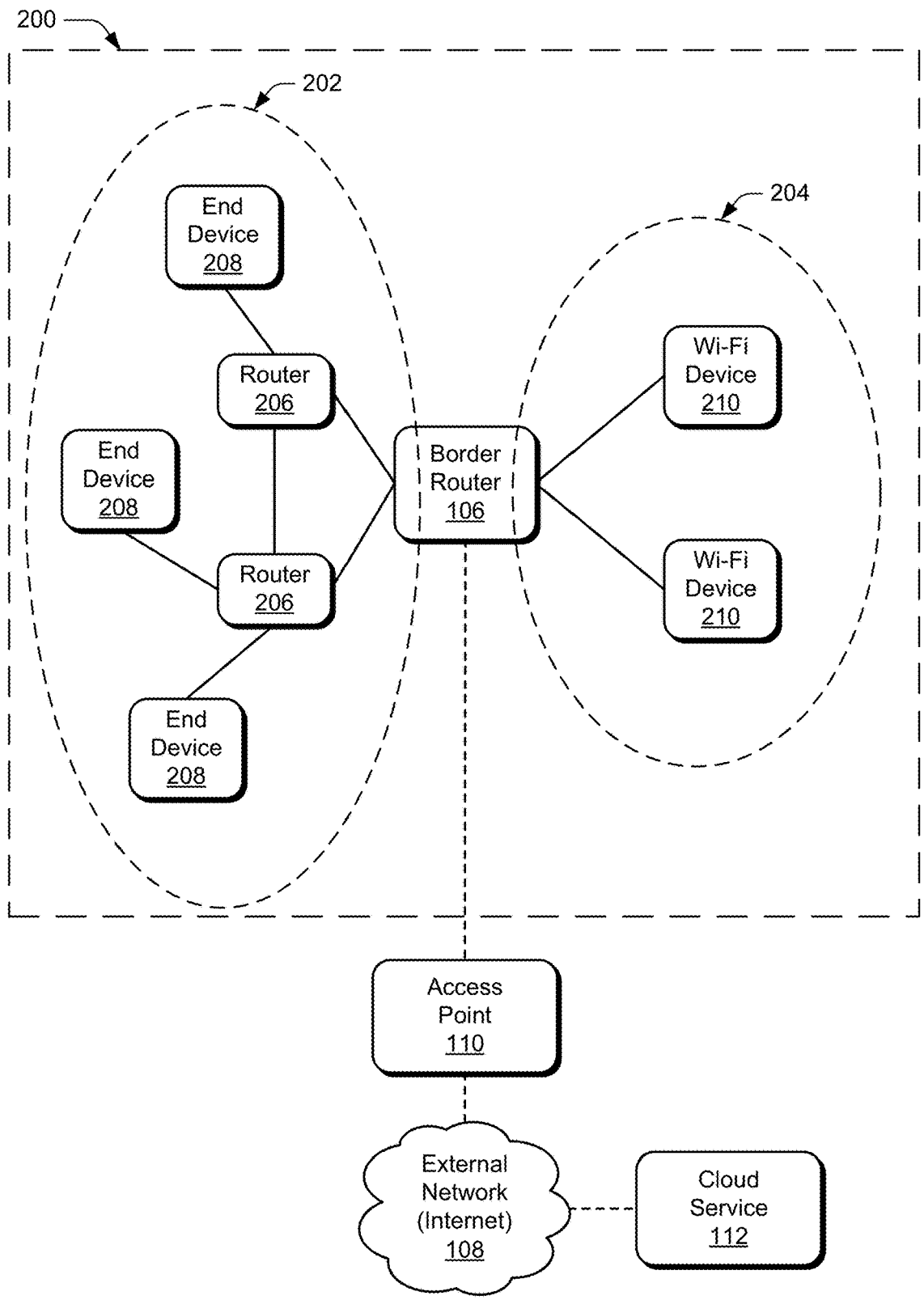
FIG. 2 illustrates an example an example home area network system in which various aspects of expressing multicast groups using Weave traits can be implemented.

FIG. 2 illustrates an example home area network system (e.g., Weave network, fabric network) in which various aspects of expressing multicast groups using Weave traits can be implemented. The home area network (HAN) 200 includes a wireless mesh network 202 (e.g., a Thread network) and a Wi-Fi network 204. The wireless mesh network 202 includes routers 206 and end devices 208. The routers 206 and the end devices 208, each include a mesh network interface for communication over the mesh network 202. The routers 206 receive and transmit packet data over the mesh network interface. The routers 206 also route traffic across the mesh network 202. The end devices 208 are devices that can communicate using the mesh network 202, but lack the capability, beyond simply forwarding to its parent router 206, to route traffic in the mesh network 202. For example, a battery-powered sensor is one type of end device 208. The Wi-Fi network 204 includes Wi-Fi devices 210. Each Wi-Fi device 210 includes a Wi-Fi network interface for communication over the Wi-Fi network 204.

The border router 106 is included in the wireless mesh network 202 and is included in the Wi-Fi network 204. The border router 106 includes a mesh network interface for communication over the mesh network 202 and a Wi-Fi network interface for communication over the Wi-Fi network 204. The border router 106 routes packets between devices in the wireless mesh network 202 and the Wi-Fi network 204. The border router 106 also routes packets between devices in the HAN 200 and external network nodes (e.g., the cloud service 112) via the external network 108, such as the Internet, through a home router or access point 110.

The devices in the mesh network 202 and the Wi-Fi network 204 use standard IP routing configurations to communicate with each other through transport protocols such as the User Datagram Protocol (UDP) or the Transmission Control Protocol (TCP). When the devices in the mesh network 202 and the Wi-Fi network 204 are provisioned as part of a Weave fabric network, the devices can communicate Weave messages over those same UDP and/or TCP transports.

Weave Traits

Figure 3:
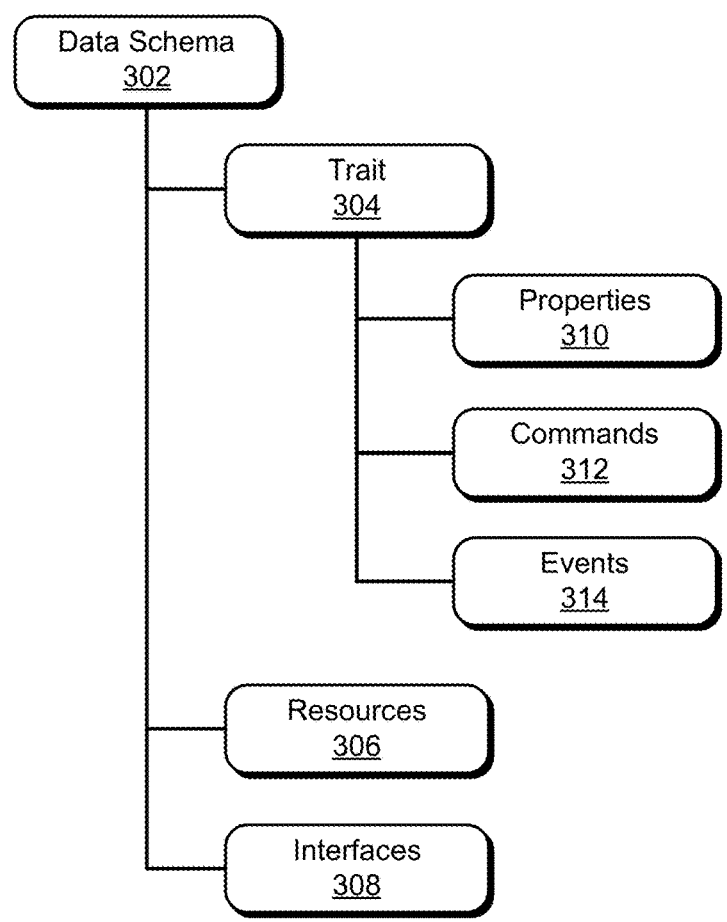
FIG. 3 illustrates an example resource model with which aspects of expressing multicast groups using Weave traits can be implemented.

FIG. 3 illustrates an example resource model 300 with which aspects of expressing multicast groups using Weave traits can be implemented. The resource model 300 illustrates a data schema 302 (e.g., Weave data schema) that supports the protocols and operations of the wireless network devices 102 and the cloud service 112. The data schema 302 describes functionality of devices, and the services and clients that interact with the devices. The data schema 302 includes traits 304, resources 306, and interfaces 308. The traits 304 describe small, composable units of functionality, which include properties 310, commands 312, and events 314, along with a semantic understanding of how the traits 304 operate to implement the functionality.

The properties 310 are characteristics of the trait 304 that represent the state of a resource, for example, the brightness of a light or whether someone is home. The properties 310 are typed, and a label and numeric tag are used to communicate each property 310. For example, the types of the properties 310 include Boolean, integer, unsigned integer, enumerated, number, string, string reference, bytes, structures, lists, maps, and so forth. The properties 310 may also have metadata indicating constraints, readability, and/or serialization specifics. The properties 310 are operated on using three state management operations or protocols: observe, update, and notify. State management is the primary means of command and control for the wireless network devices 102.

The commands 312 are requests for action sent to the trait 304 with an expected response. The command 312 has request parameters and expected response parameters. The event 314 is a unidirectional assertion of truth about a trait 304 at a specific time. This mechanism is used to asynchronously communicate occurrences on the trait 304 to other actors in the network environment 100. Most events 314 are related to property changes and communicated with a standard notify event. Other events 314 can communicate arbitrary, non-property-based occurrences, such as the ringing of a doorbell. Multiple events 314 may be correlated to enable composition across the traits 304, for example, a pincode entry event could be correlated with an unlock event indicating that the entry of a pincode caused a door to unlock. The events 314 consist of parameters and a timestamp.

The properties 310, commands 312, and events 314 work together to define a comprehensive mechanism for interacting with the traits 304. Settings and actions are primarily handled through property management, with the commands 312 for handling requests that are not amenable to the properties 310. For example, a brightness property on a lighting trait would be updated by a client to change the brightness on a physical device. An operation such as scanning Wi-Fi networks or skipping a track on a music player would use the command 312. A notification of changes on a specific entity is conveyed through property notifications and general purpose events 314, which clients may subscribe to and monitor.

The resource 306 is a group of the traits 304 and interfaces 308 that represent a logical or physical entity, such as a wireless network device 102, a structure 104, a user, or an external source of information, such as weather data. Each interface 308 is a combination of traits that operate together to provide a specific function. The traits 304 can be composed into the interfaces 308, which indicate how basic units of functionality work together to form a higher level of functionality. For example, a number of burners, controls, and on/off indicators may be composed to provide an interface for a stove. The traits 304 and instances of the interfaces 308 are collected into the resources 306, which describe all the functionality for an actor in the network environment 100, such as a device or room in the structure 104.

Weave Application Group Multicast Addressing

Figure 4:
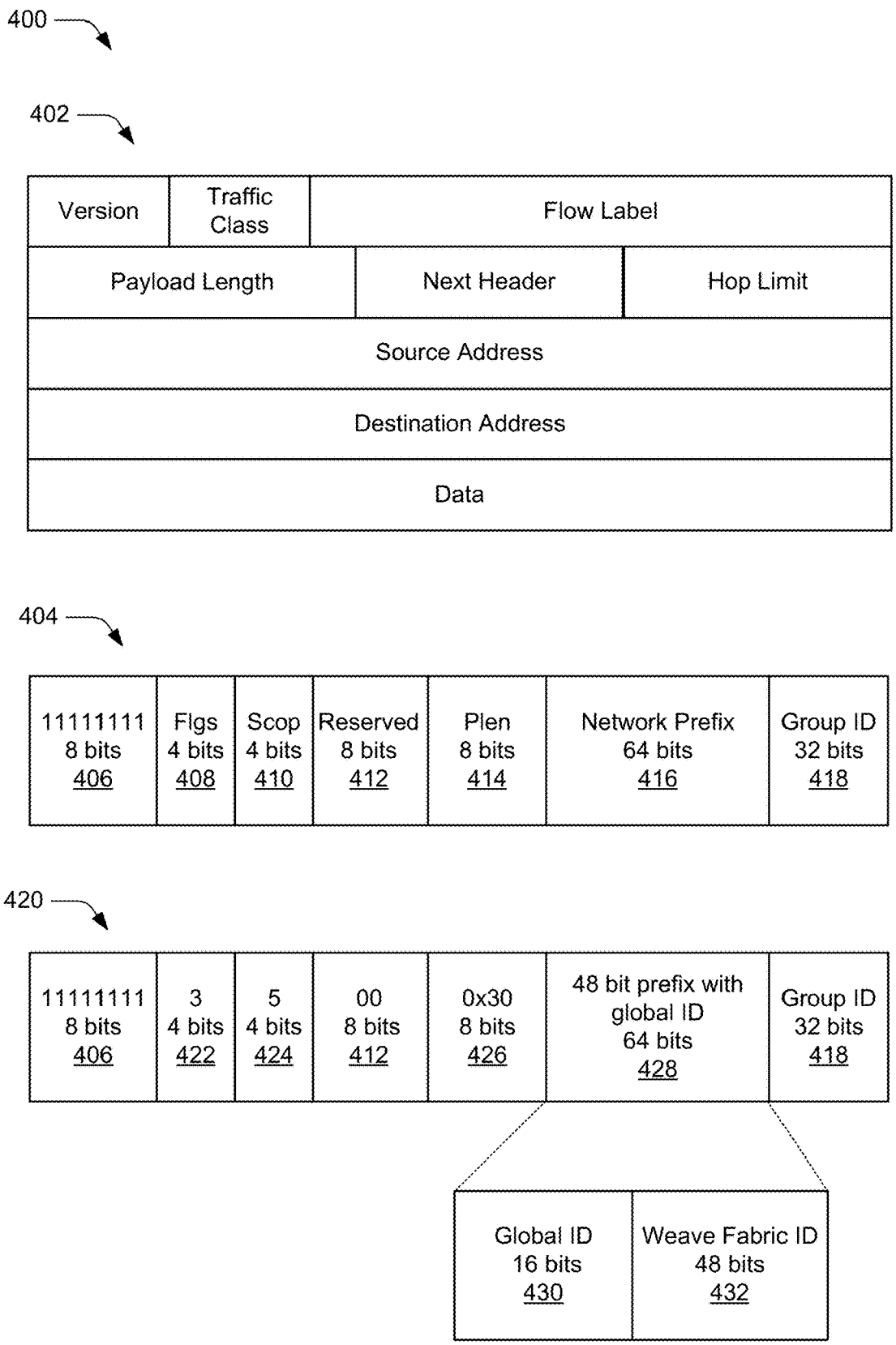
FIG. 4 illustrates example packet and address structures with which aspects of expressing multicast groups using Weave traits can be implemented.

Application groups participating in group (multicast) communication within a Weave network use custom multicast addresses. FIG. 4 illustrates example packet and address structures with which aspects of expressing multicast groups using Weave traits can be implemented. Weave networks operate using IPv6 protocols and packets. For example, a typical IPv6 packet that can be used for unicast and multicast packets is illustrated at 402. For multicast communication, the source address of the IPv6 packet is a unicast address and the destination address is a multicast address.

These multicast addresses are formed using a unique 32 bit group identifier for each application group. Weave networks do not use IPv6 network prefixes advertised by IPv6 routers for auto-configuring host addresses within the network. Weave networks use unicast-prefix-based IPv6 multicast addresses (as defined in IETF RFC 3306) that encode a network prefix as a part of the multicast address. A unicast Weave Unique Local Address (ULA) is computed based on a Weave fabric identifier (ID) and a subnetwork identifier. The Weave fabric ID is a randomly generated, unique 64-bit ID that is generated during provisioning of a Weave fabric network. The Weave fabric ID is included as part of the IPv6 global prefix. The inclusion of the Weave fabric ID in the IPv6 global prefix serves to limit the scope of these multicast addresses to within the Weave fabric. This inclusion of the Weave fabric ID as a part of the IPv6 global prefix limits Weave multicast messages from going beyond the fabric network boundary.

A unicast-prefix-based IPv6 multicast address 404, as defined in IETF RFC 3306, is used for multicast addressing in the Weave network. The four bits following the "11111111" field 406 are flgs 408 that indicate whether the multicast address 404 is based on a network prefix or not (the P flag) and whether the multicast address 404 is a well-known permanent address or a transient application-defined address (the T flag). The scop field 410 indicates the network scope where the multicast address 404 is valid. The reserved field 412 is a reserved field and is set to zero. The plen field 414 indicates the number of bits in the network prefix field 416 that identify the subnet when the P flag=1. The network prefix field 416 identifies the network prefix of the unicast subnet that owns the multicast address 404. The group ID field 418 includes a 32-bit group identifier that is a ULA associated with the application group using a respective multicast address. As described below, the value of the group ID field 418 for a particular application group is generated to be unique in the Weave network.

An example Weave multicast address 420 illustrates the values of the various fields in a multicast address used by an application group. The P flag and the T flag are both set to the value 1 resulting in the figs field having a value of 3 (at 422). The scop field is set to the value of 5 (at 424) to indicate that the multicast address 420 has a site-local scope. The plen field 426 is set to the decimal value 48 (hexadecimal 0x30) to indicate that network prefix field 416 includes 48 bits of network prefix (e.g., the Weave fabric ID). As shown at 428, the network prefix field 416 includes 16 bits of the global ID 430 concatenated with the 48-bit Weave fabric ID 432. For example, if a node is part of a Weave fabric network with the ID "<fab1>" and is communicating in an application group that has generated a group ID of "<grp1>", the corresponding application-specific multicast address with site-local scope would be: ff35:0030:<fab1><grp1>.

For example, a trait 304 maps to a group identifier with the 32 bit hexadecimal value "235a0114". The Weave network stack uses this generated group identifier to formulate a corresponding multicast address for a fabric network with a 48 bit fabric prefix "<fab1>". The resultant IPv6 multicast address generated by the Weave stack would be: ff35:0030:0:0:0:<fab/>:235a:0114. All recipient nodes of an event notification for the trait 304 would subscribe and listen on this multicast address by having the application listen on the trait 304. On the other hand, the source device would send the event to this trait 304 using the multicast address as the destination address.

This multicast address format allows for 232 (4,294,967,296) group identifiers for application groups. A multicast packet generated using the 48 bit fabric prefix (Weave fabric ID) can be forwarded between the wireless mesh network 202 and the Wi-Fi network 204, for example by the border router 106. As such, the multicast packet is be capable of traversing between any nodes in the wireless mesh network 202 and the Wi-Fi network 204. Alternatively, unicast prefix-based scoping of multicast addresses can be adjusted to confine the multicast domain within each subnet of the Weave prefix, for example, by selecting a 64 bit prefix for the wireless mesh network 202 subnet or a 64 bit prefix for the Wi-Fi network 204 subnet.

Expressing Multicast Groups Using Weave Traits

When an application in a Weave-enabled node wants to address (publish information to) other nodes in an application group, the node needs to construct a multicast address for that application group. Similarly, when an application in a Weave-enabled node intends to listen to (subscribe to information published on) a multicast communication channel, the nodes need to construct the appropriate multicast address for the application group before joining the multicast address. A trait 304 is a high-level, abstract construct that can be mapped to a multicast address by the Weave network stack. Using a trait 304 to map to the correct multicast address for an application group simplifies referencing the group's multicast address as compared to referencing a concrete multicast address.

An application group communication can be related to an individual trait 304. As discussed above, a resource 306 can include one or more traits 304, and an interface 308 can include one or more traits 304. As such, an application group communication be related to a resource 306 or an interface 308 based on a trait 304 included in the resource 306 or the interface 308. Each trait 304 has an associated numerical trait identifier (trait ID), each resource 306 has an associated numerical resource identifier (resource ID), and each interface 308 has an associated numerical interface identifier (interface ID).

To generate a multicast address for an application group to either publish to the multicast address or subscribe to messages addressed to the multicast address, a node can use a trait ID, a resource ID, or an interface ID as an input to an address generation function. In one aspect, a node that generates a multicast address for an application group using a trait ID can receive (subscribe to) all multicast messages using that generated multicast address. For example, if the trait ID is associated with a trait 304 for temperature readings from temperature sensors in the Weave network, the node can receive messages (e.g., WDM notification messages) from any nodes publishing temperature readings. The trait 304 and its associated trait ID may be associated with any of the sensor data from any sensor as described in detail below in relation to FIG. 7, for example, temperature, carbon monoxide, smoke, humidity, motion, a switch actuation (e.g., door sensor switch, window sensor switch, light switch, doorbell pushbutton switch, and so forth) or the like.

In a further aspect, a node that generates a multicast address for an application group using a resource ID that is associated with a physical or virtual resource in the Weave network can receive (subscribe to) all multicast messages from the associated resource, or the resource (physical or virtual) associated with the resource ID can publish to the generated multicast address. For example, if the resource ID is associated with a resource 306 for a hazard detector in the Weave network, the node can receive messages for any data that the hazard detector publishes, for example, a temperature reading, a carbon monoxide level, an alarm status (e.g., smoke alarm, carbon monoxide alarm, temperature alarm, or the like), a battery status, or the like. The resource 306 and its associated resource ID may be associated with any of the devices as described in detail below in relation to FIG. 7, for example, a thermostat, a hazard detector, a doorbell, a camera, a lighting controller, a security hub, a door lock, or the like. In another example, the resource may be a virtual resource in the Weave network that represents a logical entity, for example, an element of the home graph for the structure 104, a user, or an external source of information, such as weather data.

In another aspect, a node that generates a multicast address for an application group using an interface ID can receive (subscribe to) all multicast messages from that respective interface that is combination of traits that operate together to provide a specific function in the Weave network. Any resource (physical or virtual) or trait included in the interface can publish to the generated multicast address. For example, an interface for door lock in the Weave network includes the traits that define the operations and status of the physical door lock device, (e.g., PIN codes stored in the door lock device, locked/unlocked status, as such), and traits of one or more virtual resources associated with the door lock (e.g., a user assigned name for the door lock, a schedule for active PIN codes for the lock, or the like) that enhance the functionality present in the physical lock device. The node can receive messages for any data that is published for the collection of traits included in the interface 308 whether the messages originated from a trait in the physical device or the virtual resource. The interface and its associated interface ID may be associated with any combination of traits of the devices or virtual resources as described in detail below in relation to FIG. 7.

To construct the multicast address for an application group, a node uses an application group identifier (e.g., a trait ID, a resource ID, or an interface ID) to construct the corresponding multicast address using the Weave fabric prefix and the application group identifier. For example, an application in a node sending data in a message to the application group makes an API call (e.g., Send API) to the Weave network stack including the application group identifier and the data as parameters in the API call. The Weave network stack (e.g., the network layer in the stack) constructs the multicast address for addressing an IPv6 packet for the message addressed to the application group. Alternatively, the application can generate the multicast address for the application group and pass the generated multicast address in the API call to the Weave network stack.

To generate the multicast address for the application group, the Weave stack (or alternatively the application) in a node uses the application group identifier (e.g., a trait ID, a resource ID, or an interface ID) as an input to a hash function to generate a group identifier 418 (e.g., a 32-bit integer value) in the Weave system. To generate the multicast address, the network layer concatenates the fields as described at 420 in FIG. 4 and described above, using the output value generated by the hash function for the group ID field 418 in the multicast address 420. The network layer inserts the generated multicast address into the destination field of an IPv6 packet 402 along with information for the additional fields in the IPv6 packet 402 and passes the generated IPv6 packet to a Medium Access Control (MAC) layer of the Weave network stack for transmission over the Weave network.

To subscribe to the multicast address for an application group, a node uses an application group identifier (e.g., a trait ID, a resource ID, or an interface ID) to construct the corresponding multicast address using the Weave fabric prefix and the application group identifier. For example, an application in a node makes an API call to the Weave network stack including the application group identifier in the API call. The Weave network stack (e.g., the network layer in the Weave network stack) generates the multicast address for the subscribed application group. The network layer in the Weave network stack filters received multicast messages based on the generated multicast address and passes messages with matching multicast address to the next higher layer of the network stack to send the received messages to the application in the node. Alternatively, the application can generate the multicast address for the application group and pass the generated multicast address in the API call to the Weave network stack.

As many nodes in the Weave network may be battery-powered, the hash function used to generate the multicast address should computationally-efficient and energy-efficient. For example, the hash function may be the non-cryptographic Fowler-Noll-Vo hash algorithm (FNV) that has the properties of being fast to compute and gives well-distributed results. This multicast address format allows for 232 (4,294,967,296) group identifiers for application groups which in conjunction with the well-distributed characteristics of the Fowler-Noll-Vo hash algorithm minimizes the likelihood of non-unique group IDs 418. In the event of non-unique group IDs in a Weave network, the contents of the WDM message in the data field of the IPv6 packet provides additional information to enable an application to further filter received data and discard data that is not of interest to the application.

Example Methods

Example methods 500 and 600 are described with reference to FIGS. 5 and 6 in accordance with one or more aspects of expressing multicast groups using Weave traits. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method blocks are described is not intended to be construed as a limitation, and any number of the described method blocks can be combined in any order or skipped to implement a method or an alternate method.

Figure 5:
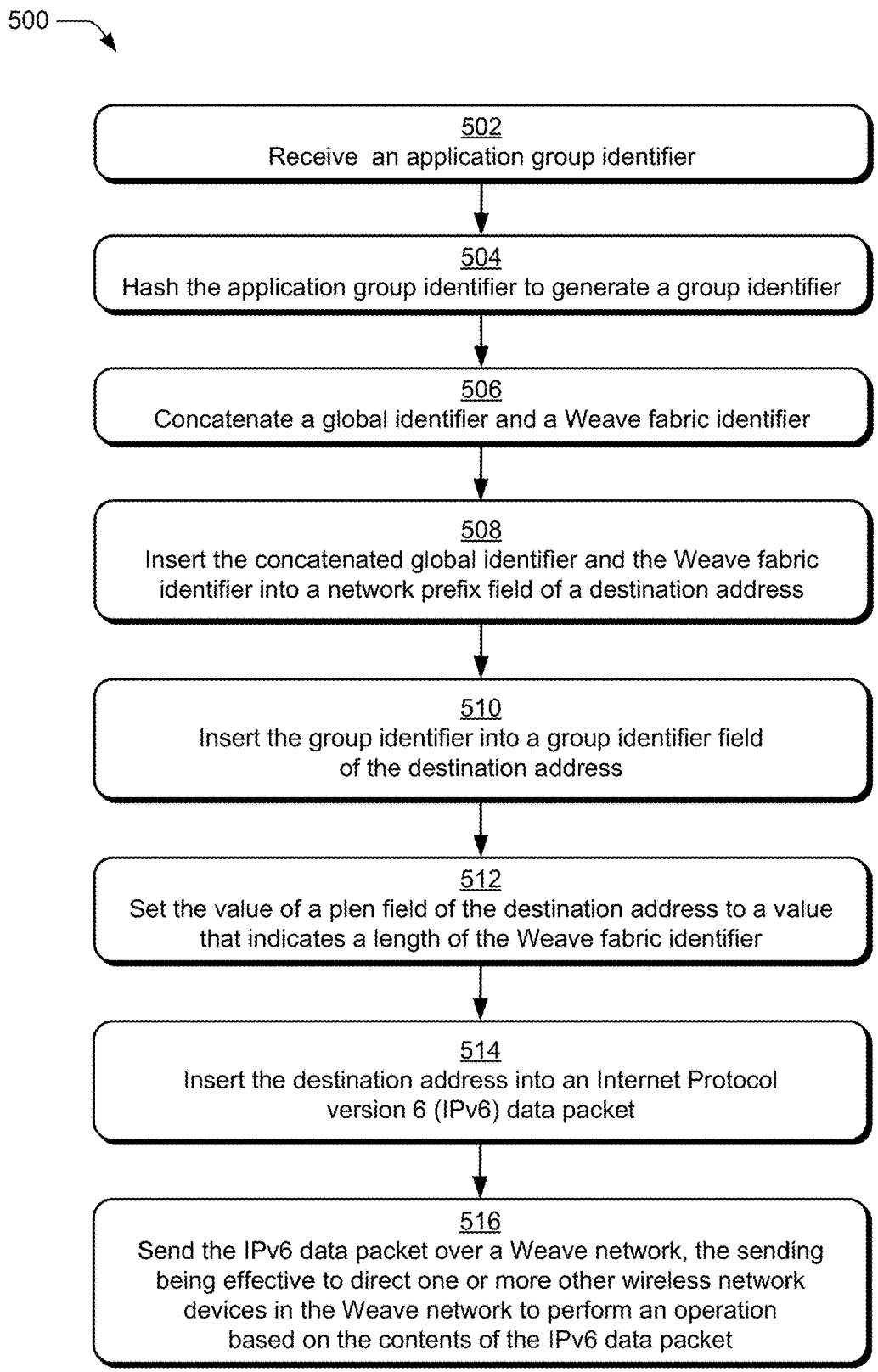
FIG. 5 illustrates an example method of expressing multicast groups using Weave traits as in accordance with aspects of the techniques described herein.

FIG. 5 illustrates example method(s) 500 of expressing multicast groups using Weave traits as generally related to a wireless network device generating and transmitting an IPv6 data packet that includes a multicast address. At block 502, a wireless network device receives an application group identifier. For example, a Weave network stack in the wireless network device receives an application group identifier from an application.

At block 504, the wireless network device hashes the application group identifier to generate a group identifier. For example, the Weave stack hashes the application group identifier to generate a group identifier (e.g., the group identifier 418).

At block 506, the wireless network device concatenates a global identifier and a Weave fabric identifier. For example, the Weave stack concatenates a global identifier (e.g., the global identifier 430) and a Weave fabric identifier (e.g., the Weave fabric ID 432).

At block 508, the wireless network device inserts the concatenated global identifier and the Weave fabric identifier into a network prefix field of a destination address. For example, the Weave stack inserts the concatenated global identifier and the Weave fabric identifier into a network prefix field (e.g., the network prefix field 428) of a destination address (e.g., the destination address 420).

At block 510, the wireless network device inserts the group identifier into a group identifier field of the destination address. For example, the Weave stack inserts the group identifier into a group identifier field (e.g., the group ID field 418) of the destination address.

At block 512, the wireless network device sets the value of a plen field of the destination address to a value that indicates a length of the Weave fabric identifier. For example, the Weave stack sets the value of a plen field (e.g., the plen field 426) of the destination address to a value that indicates a length (e.g., 30 bits) of the Weave fabric identifier.

At block 514, the wireless network device inserts the destination address into an Internet Protocol version 6 (IPv6) data packet. For example, the Weave stack inserts the destination address into an Internet Protocol version 6 (IPv6) data packet (e.g., the IPv6 data packet 402).

At block 516, the wireless network device sends the IPv6 data packet over a Weave network, the sending being effective to direct one or more other wireless network devices in the Weave network to perform an operation based on the contents of the IPv6 data packet. For example, the Weave stack sends the IPv6 data packet over a Weave network (e.g., the Weave network 200), the sending being effective to direct one or more other wireless network devices in the Weave network to perform an operation based on the contents of the IPv6 data packet.

Figure 6:
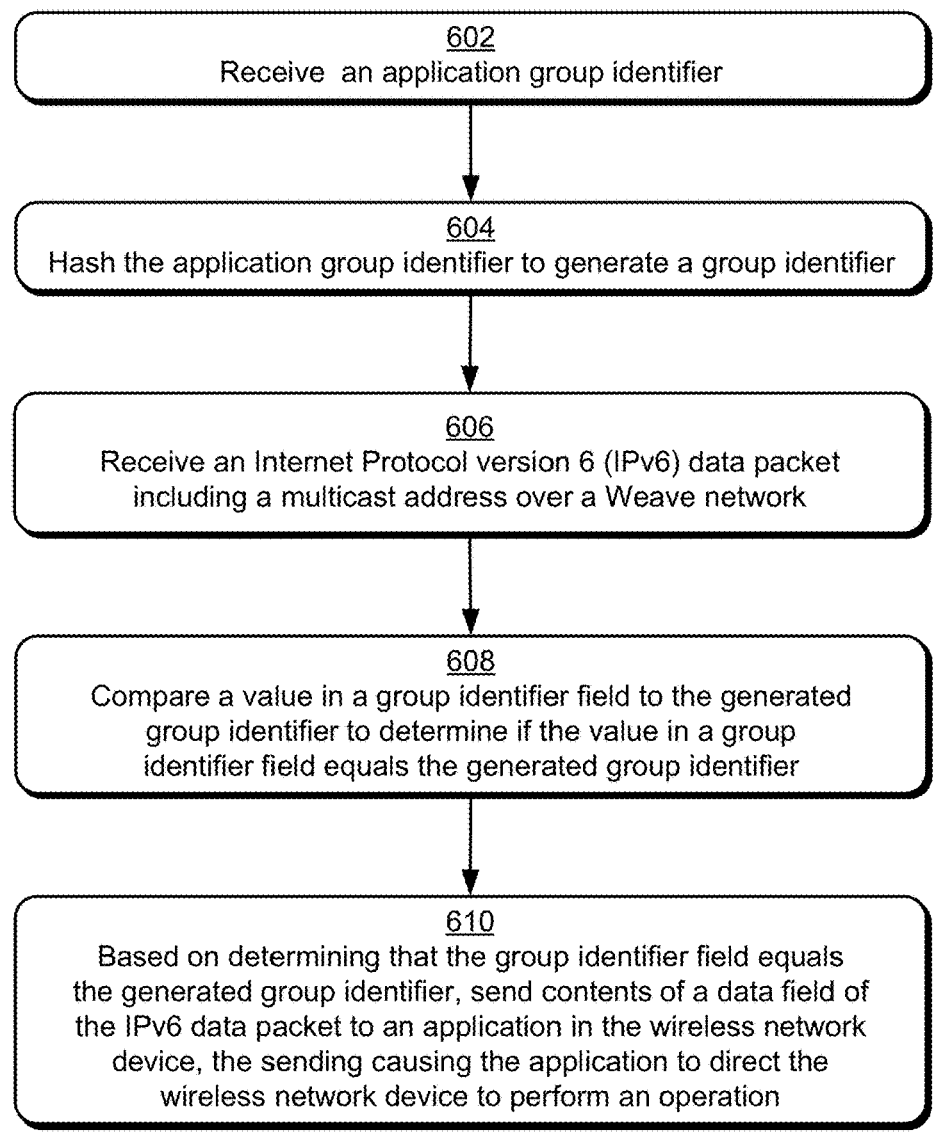
FIG. 6 illustrates an example method of expressing multicast groups using Weave traits as in accordance with aspects of the techniques described herein.

FIG. 6 illustrates example method(s) 600 of expressing multicast groups using Weave traits as generally related to a wireless network device filtering a received IPv6 data packet that includes a multicast address. At block 602, a wireless network device receives an application group identifier. For example, a Weave network stack in the wireless network device receives an application group identifier from an application.

At block 604, the wireless network device hashes the application group identifier to generate a group identifier. For example, the Weave stack hashes the application group identifier to generate a group identifier (e.g., the group identifier 418).

At block 606, the wireless network device receives an Internet Protocol version 6 (IPv6) data packet including a multicast address over a Weave network. For example, the Weave stack receives an IPv6 data packet (e.g., the IPv6 data packet 402) including a multicast address (e.g., the destination address 420) over a Weave network (e.g., the Weave network 200).

At block 608, the wireless network device compares a value in a group identifier field to the generated group identifier to determine if the value in a group identifier field equals the generated group identifier. For example, the Weave stack compares a value in a group identifier field (e.g., the group ID field 418) to the generated group identifier to determine if the value in a group identifier field equals the generated group identifier.

At block 610, based on the determining that the group identifier field equals the generated group identifier, the wireless network device sends contents of a data field of the IPv6 data packet to an application in the wireless network device, the sending causing the application to direct the wireless network device to perform an operation. For example, the Weave stack determines that the group identifier field equals the generated group identifier, and the Weave stack sends contents of a data field of the IPv6 data packet to an application in the wireless network device. Based on the contents of the data field, the application in the wireless network device performs an operation.

Example Environments and Devices

Figure 7:
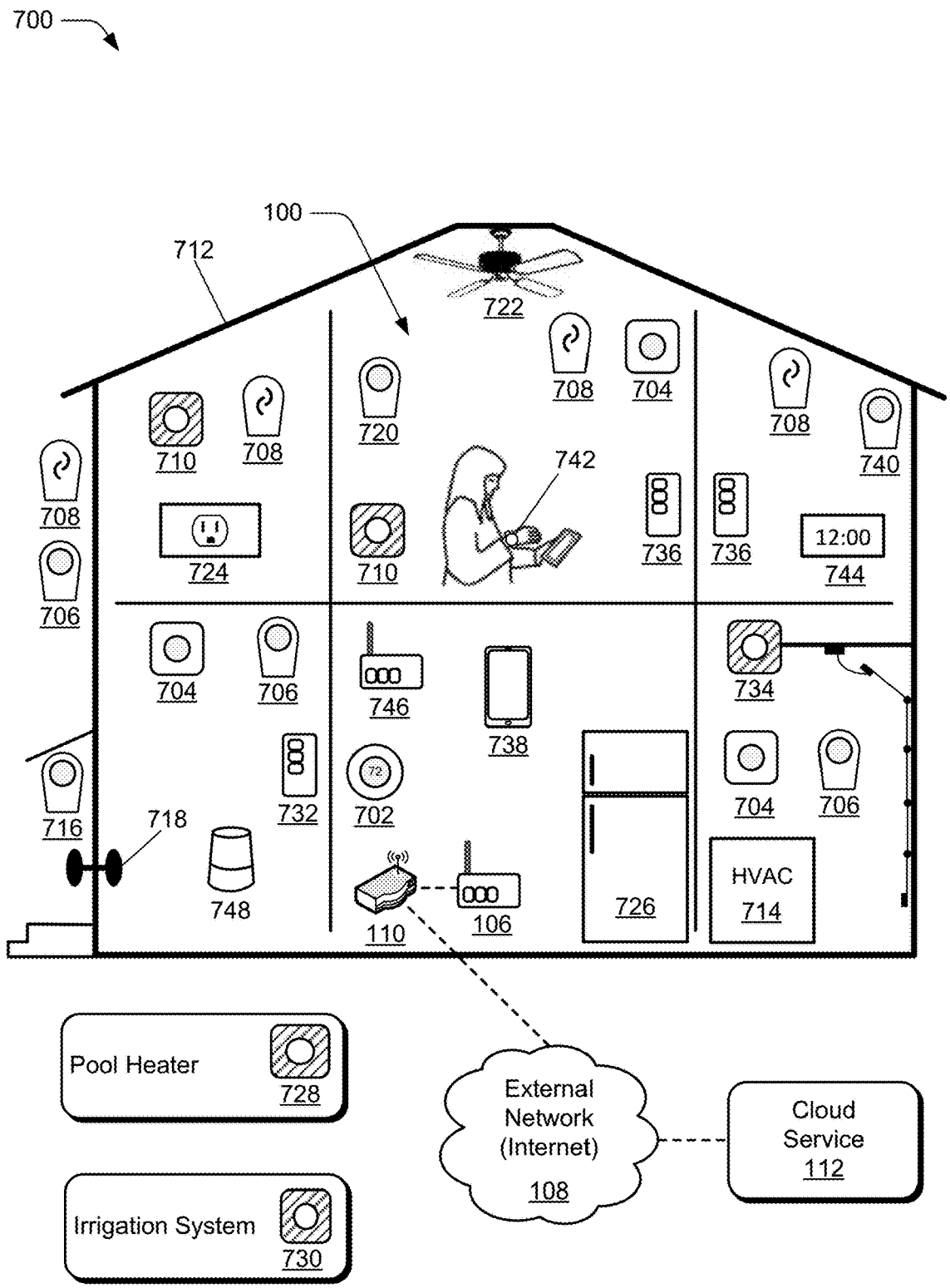
FIG. 7 illustrates an example environment in a which a home area network can be implemented in accordance with aspects of the techniques described herein.

FIG. 7 illustrates an example environment 700 in which a home area network 200 (Weave network 200), as described with reference to FIG. 2, and aspects of expressing multicast groups using Weave traits can be implemented. Generally, the environment 700 includes the home area network (HAN) 200 implemented as part of a home or other type of structure with any number of wireless network devices that are configured for communication in a wireless network. For example, the wireless network devices can include a thermostat 702, hazard detectors 704 (e.g., for smoke and/or carbon monoxide), cameras 706 (e.g., indoor and outdoor), lighting units 708 (e.g., indoor and outdoor), and any other types of wireless network devices 710 that are implemented inside and/or outside of a structure 712 (e.g., in a home environment). In this example, the wireless network devices can also include any of the previously described devices, such as a border router 106, as well as any of the devices implemented as a router device 206, and/or as an end device 208.

In the environment 700, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 8.

In implementations, the thermostat 702 may include a Nest® Learning Thermostat that detects ambient climate characteristics (e.g., temperature and/or humidity) and controls a HVAC system 714 in the home environment. The learning thermostat 702 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 704 can be implemented to detect the presence of a hazardous substance or a substance indicative of a hazardous substance (e.g., smoke, fire, or carbon monoxide). In examples of wireless interconnection, a hazard detector 704 may detect the presence of smoke, indicating a fire in the structure, in which case the hazard detector that first detects the smoke can broadcast a low-power wake-up signal to all of the connected wireless network devices. The other hazard detectors 704 can then receive the broadcast wake-up signal and initiate a high-power state for hazard detection and to receive wireless communications of alert messages. Further, the lighting units 708 can receive the broadcast wake-up signal and activate in the region of the detected hazard to illuminate and identify the problem area. In another example, the lighting units 708 may activate in one illumination color to indicate a problem area or region in the structure, such as for a detected fire or break-in, and activate in a different illumination color to indicate safe regions and/or escape routes out of the structure.

In various configurations, the wireless network devices 710 can include an entryway interface device 716 that functions in coordination with a network-connected door lock system 718, and that detects and responds to a person's approach to or departure from a location, such as an outer door of the structure 712. The entryway interface device 716 can interact with the other wireless network devices based on whether someone has approached or entered the smart-home environment. An entryway interface device 716 can control doorbell functionality, announce the approach or departure of a person via audio or visual means, and control settings on a security system, such as to activate or deactivate the security system when occupants come and go. The wireless network devices 710 can also include other sensors and detectors, such as to detect ambient lighting conditions, detect room-occupancy states (e.g., with an occupancy sensor 720), and control a power and/or dim state of one or more lights. In some instances, the sensors and/or detectors may also control a power state or speed of a fan, such as a ceiling fan 722. Further, the sensors and/or detectors may detect occupancy in a room or enclosure and control the supply of power to electrical outlets or devices 724, such as if a room or the structure is unoccupied.

The wireless network devices 710 may also include connected appliances and/or controlled systems 726, such as refrigerators, stoves and ovens, washers, dryers, air conditioners, pool heaters 728, irrigation systems 730, security systems 732, and so forth, as well as other electronic and computing devices, such as televisions, entertainment systems, computers, intercom systems, garage-door openers 734, ceiling fans 722, control panels 736, and the like. When plugged in, an appliance, device, or system can announce itself to the home area network as described above and can be automatically integrated with the controls and devices of the home area network, such as in the home. It should be noted that the wireless network devices 710 may include devices physically located outside of the structure, but within wireless communication range, such as a device controlling a swimming pool heater 728 or an irrigation system 730.

As described above, the HAN 200 includes a border router 106 that interfaces for communication with an external network, outside the HAN 200. The border router 106 connects to an access point 110, which connects to the communication network 108, such as the Internet. A cloud service 112, which is connected via the communication network 108, provides services related to and/or using the devices within the HAN 200. By way of example, the cloud service 112 can include applications for connecting end user devices 738, such as smartphones, tablets, and the like, to devices in the home area network, processing and presenting data acquired in the HAN 200 to end users, linking devices in one or more HANs 200 to user accounts of the cloud service 112, provisioning and updating devices in the HAN 200, and so forth. For example, a user can control the thermostat 702 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the wireless network devices in the HAN 200 can serve as low-power and communication nodes to create the HAN 200 in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 740 detects that the room is dark and when the occupancy sensor 720 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (i.e., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 708 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 708 that lead to a safe exit. The light units 708 may also be turned-on to indicate the direction along an exit route that a person should travel to safely exit the structure.

The various wireless network devices may also be implemented to integrate and communicate with wearable computing devices 742, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 710 may also include a network-connected alarm clock 744 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 702 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 702 so as to pre-heat or cool the environment to a desired setting and turning-on or turning-off the lights 708.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 700 may include one or more wireless network devices that function as a hub 746. The hub 746 may be a general-purpose home automation hub, or an application-specific hub, such as a security hub, an energy management hub, an HVAC hub, and so forth. The functionality of a hub 746 may also be integrated into any wireless network device, such as a network-connected thermostat device or the border router 106. Hosting functionality on the hub 746 in the structure 712 can improve reliability when the user's internet connection is unreliable, can reduce latency of operations that would normally have to connect to the cloud service 112, and can satisfy system and regulatory constraints around local access between wireless network devices.

Additionally, the example environment 700 includes a network-connected-speaker 748. The network-connected speaker 748 provides voice assistant services that include providing voice control of network-connected devices. The functions of the hub 746 may be hosted in the network-connected speaker 748. The network-connected speaker 748 can be configured to communicate via the wireless mesh network 202, the Wi-Fi network 204, or both.

Figure 8:
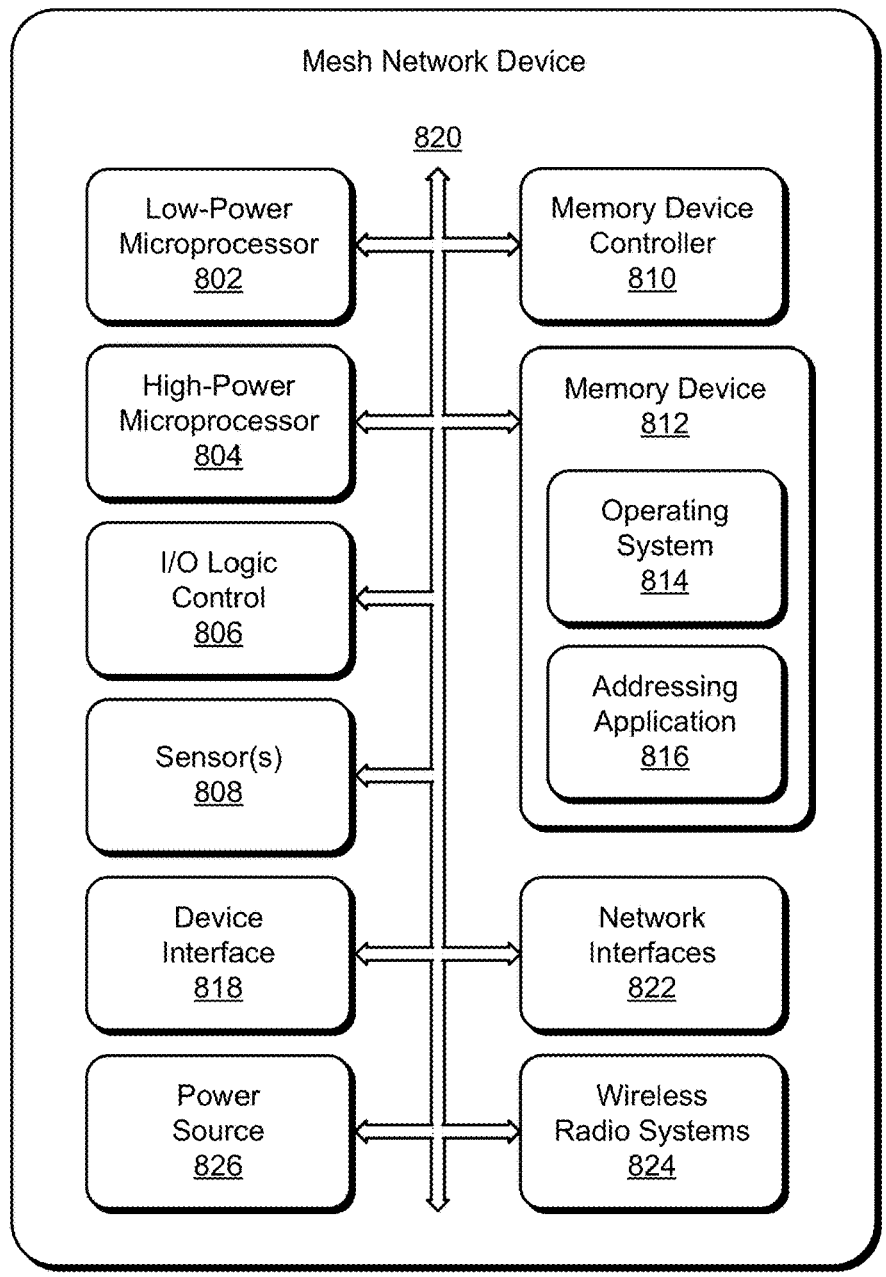
FIG. 8 illustrates an example wireless network device that can be implemented in a home area network environment in accordance with one or more aspects of the techniques described herein.

FIG. 8 illustrates an example wireless network device 800 that can be implemented as any of the wireless network devices in a home area network (Weave network) in accordance with one or more aspects of expressing multicast groups using Weave traits as described herein. The device 800 can be integrated with electronic circuitry, microprocessors, memory, input output (I/O) logic control, communication interfaces and components, as well as other hardware, firmware, and/or software to implement the device in a home area network. Further, the wireless network device 800 can be implemented with various components, such as with any number and combination of different components as further described with reference to the example device shown in FIG. 9.

In this example, the wireless network device 800 includes a low-power microprocessor 802 and a high-power microprocessor 804 (e.g., microcontrollers or digital signal processors) that process executable instructions. The device also includes an input-output (I/O) logic control 806 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 802 and the high-power microprocessor 604 can also support one or more different device functionalities of the device. For example, the high-power microprocessor 804 may execute computationally intensive operations, whereas the low-power microprocessor 802 may manage less-complex processes such as detecting a hazard or temperature from one or more sensors 808. The low-power processor 802 may also wake or initialize the high-power processor 804 for computationally intensive processes.

The one or more sensors 808 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 808 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 800 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 800 includes a memory device controller 810 and a memory device 812, such as any type of a nonvolatile memory and/or other suitable electronic data storage device. The wireless network device 800 can also include various firmware and/or software, such as an operating system 814 that is maintained as computer executable instructions by the memory and executed by a microprocessor. The device software may also include an address application 816 (e.g., a Weave network stack) that implements aspects of expressing multicast groups using Weave traits. The wireless network device 800 also includes a device interface 818 to interface with another device or peripheral component and includes an integrated data bus 820 that couples the various components of the wireless network device for data communication between the components. The data bus in the wireless network device may also be implemented as any one or a combination of different bus structures and/or bus architectures.

The device interface 818 may receive input from a user and/or provide information to the user (e.g., as a user interface), and a received input can be used to determine a setting. The device interface 818 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 818 may also receive inputs from any number of peripherals, such as buttons, a keypad, a switch, a microphone, and an imager (e.g., a camera device).

The wireless network device 800 can include network interfaces 822, such as a home area network interface for communication with other wireless network devices in a home area network, and an external network interface for network communication, such as via the Internet. The wireless network device 800 also includes wireless radio systems 824 for wireless communication with other wireless network devices via the home area network interface and for multiple, different wireless communications systems. The wireless radio systems 824 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wireless network device 800 also includes a power source 826, such as a battery and/or to connect the device to line voltage. An AC power source may also be used to charge the battery of the device.

Figure 9:
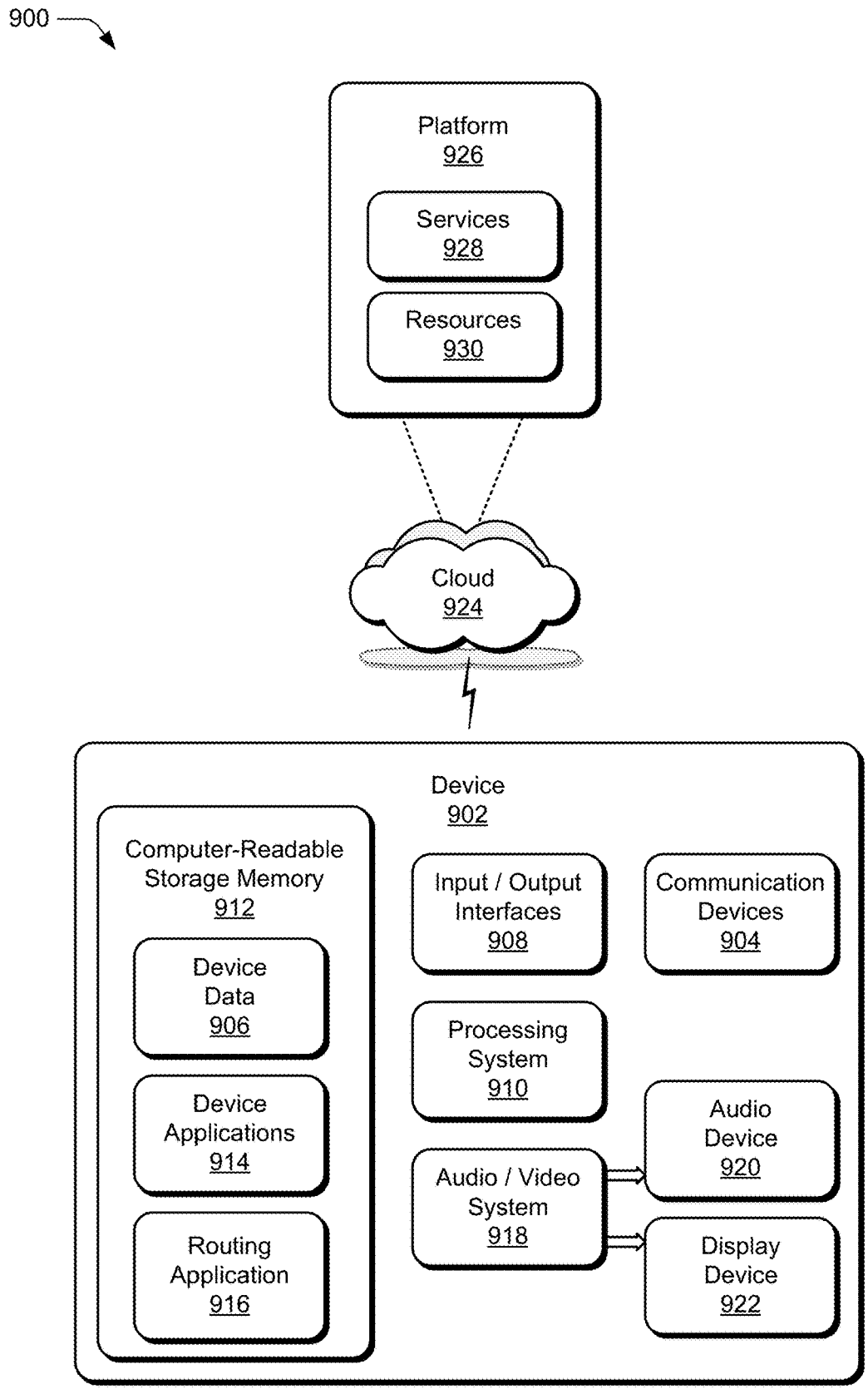
FIG. 9 illustrates an example system with an example device that can implement aspects of expressing multicast groups using Weave traits.

FIG. 9 illustrates an example system 900 that includes an example device 902, which can be implemented as any of the wireless network devices that implement aspects of expressing multicast groups using Weave traits as described with reference to the previous FIGS. 1-8. The example device 902 may be any type of computing device, client device, mobile phone, tablet, communication, entertainment, gaming, media playback, and/or other type of device. Further, the example device 902 may be implemented as any other type of wireless network device that is configured for communication on a home area network, such as a thermostat, hazard detector, camera, light unit, commissioning device, router, border router, joiner router, joining device, end device, leader, access point, and/or other wireless network devices.

The device 902 includes communication devices 904 that enable wired and/or wireless communication of device data 906, such as data that is communicated between the devices in a home area network, data that is being received, data scheduled for broadcast, data packets of the data, data that is synched between the devices, etc. The device data can include any type of communication data, as well as audio, video, and/or image data that is generated by applications executing on the device. The communication devices 904 can also include transceivers for cellular phone communication and/or for network data communication.

The device 902 also includes input/output (I/O) interfaces 908, such as data network interfaces that provide connection and/or communication links between the device, data networks (e.g., a home area network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 902 includes a processing system 910 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The device 902 also includes computer-readable storage memory 912, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 912 provides storage of the device data 906 and various device applications 914, such as an operating system that is maintained as a software application with the computer-readable storage memory and executed by the processing system 910. The device applications may also include a device manager, such as any form of a control application, software application, signal processing and control module, code that is native to a particular device, a hardware abstraction layer for a particular device, and so on. In this example, the device applications also include a routing application 916 that implements aspects of common interface for multicast address subscriptions, such as when the example device 902 is implemented as any of the wireless network devices described herein.

The device 902 also includes an audio and/or video system 918 that generates audio data for an audio device 920 and/or generates display data for a display device 922. The audio device and/or the display device include any devices that process, display, and/or otherwise render audio, video, display, and/or image data, such as the image content of a digital photo. In implementations, the audio device and/or the display device are integrated components of the example device 902. Alternatively, the audio device and/or the display device are external, peripheral components to the example device. In aspects, at least part of the techniques described for common interface for multicast address subscriptions may be implemented in a distributed system, such as over a "cloud" 924 in a platform 926. The cloud 924 includes and/or is representative of the platform 926 for services 928 and/or resources 930.

The platform 926 abstracts underlying functionality of hardware, such as server devices (e.g., included in the services 928) and/or software resources (e.g., included as the resources 930), and connects the example device 902 with other devices, servers, etc. The resources 930 may also include applications and/or data that can be utilized while computer processing is executed on servers that are remote from the example device 902. Additionally, the services 928 and/or the resources 930 may facilitate subscriber network services, such as over the Internet, a cellular network, or Wi-Fi network. The platform 926 may also serve to abstract and scale resources to service a demand for the resources 930 that are implemented via the platform, such as in an interconnected device aspect with functionality distributed throughout the system 900. For example, the functionality may be implemented in part at the example device 902 as well as via the platform 926 that abstracts the functionality of the cloud 924.

In the following some examples are described:

Example 1: A method for generating a multicast address by a wireless network device, the method comprising:
- receiving an application group identifier;
- hashing the application group identifier to generate a group identifier;
- concatenating a global identifier and a Weave fabric identifier;
- inserting the concatenated global identifier and the Weave fabric identifier into a network prefix field of a destination address;
- inserting the group identifier into a group identifier field of the destination address;
- setting the value of a plen field of the destination address to a value that indicates a length of the Weave fabric identifier;
- inserting the destination address into an Internet Protocol version 6 (IPv6) data packet; and
- sending the IPv6 data packet over a Weave network, the sending being effective to direct one or more other wireless network devices in the Weave network to perform an operation based on the contents of the IPv6 data packet.

Example 2: The method of example 1, wherein the group identifier is a trait identifier, and wherein the trait identifier is associated with a trait in the Weave network.

Example 3: The method of example 1, wherein the group identifier is a resource identifier, and wherein the resource identifier is associated with a resource in the Weave network.

Example 4: The method of example 1, wherein the group identifier is an interface identifier, and wherein the interface identifier is associated with an interface in the Weave network.

Example 5: The method of any one of the preceding examples, wherein the Weave network comprises:
- a wireless mesh subnetwork; and
- a Wi-Fi subnetwork.

Example 6: The method of example 5, wherein the IPv6 data packet is routable between the wireless mesh subnet and the Wi-Fi subnet.

Example 7: The method of example 5 or example 6, wherein the wireless mesh network is a Thread network.

Example 8: The method of any of the preceding examples, the method further comprising:
- setting a scop field in the destination address to a value that indicates that the destination address has a site-local scope, the value of the scop field preventing routing of the IPv6 packet outside the Weave network.

Example 9: The method of any of the preceding examples, wherein the hashing the application group identifier to produce the group identifier comprises:
- hashing the application group identifier with a Fowler-Noll-Vo hash algorithm to produce the group identifier.

Example 10: A method for filtering a multicast address by a wireless network device, the method comprising:
- receiving an application group identifier;
- hashing the application group identifier to generate a group identifier;
- receiving an Internet Protocol version 6 (IPv6) data packet including a multicast address over a Weave network;
- comparing a value in a group identifier field to the generated group identifier to determine if the value in a group identifier field equals the generated group identifier; and
- based on the determining that the group identifier field equals the generated group identifier, sending contents of a data field of the IPv6 data packet to an application in the wireless network device, the sending causing the application to direct the wireless network device to perform an operation.

Example 11: The method of example 10:
- wherein the group identifier is a trait identifier, and wherein the trait identifier is associated with a trait in the Weave network;
- wherein the group identifier is a resource identifier, and wherein the resource identifier is associated with a resource in the Weave network; or
- wherein the group identifier is an interface identifier, and wherein the interface identifier is associated with an interface in the Weave network.

Example 12: The method of example 10 or example 11, wherein the hashing the application group identifier to produce the group identifier comprises:
- hashing the application group identifier with a Fowler-Noll-Vo hash algorithm to produce the group identifier.

Example 13: A wireless network device comprising:
- a wireless network interface;
- a processor; and
- memory comprising instructions executable by the processor that configure the wireless network device to perform the method of any of the preceding examples.

Example 14: The wireless network device of example 13, wherein the wireless network interface is a Thread network interface.

Example 15: The wireless network device of example 13, wherein the wireless network interface is a Wi-Fi network interface.

Example 16: The wireless network device of example 13, wherein the wireless network device comprises:
- a thermostat;
- a hazard detector;
- a camera;
- a lighting unit;
- an entryway interface device;
- a door lock;
- a doorbell;

an occupancy sensor;
a motion detector;
a control panel;
a security sensor;
a hub;
a home automation hub;
a security hub; or
a network-connected speaker.

Example 17: A wireless network device comprising:
a Thread network interface;
a Wi-Fi network interface;
a processor; and
memory comprising instructions executable by the processor that configure the wireless network device to perform the method of any one of examples 1 to 12.

Example 18: The wireless network device of claim 17, wherein the wireless network device is a border router.

Although aspects of expressing multicast groups using Weave traits have been described in language specific to features and/or methods, the subject of the appended claims is not necessarily limited to the specific features or methods described. Rather, the specific features and methods are disclosed as example implementations of expressing multicast groups using Weave traits, and other equivalent features and methods are intended to be within the scope of the appended claims. Further, various different aspects are described, and it is to be appreciated that each described aspect can be implemented independently or in connection with one or more other described aspects.

The invention claimed is:

1. A method for generating a multicast address by a wireless network device, the method comprising:
    receiving an application group identifier;
    hashing the application group identifier to generate a group identifier;
    concatenating a global identifier and a Weave fabric identifier;
    inserting the concatenated global identifier and the Weave fabric identifier into a network prefix field of a destination address;
    inserting the group identifier into a group identifier field of the destination address;
    setting the value of a plen field of the destination address to a value that indicates a length of the Weave fabric identifier;
    inserting the destination address into an Internet Protocol version 6 (IPv6) data packet; and
    sending the IPv6 data packet over a Weave network, the sending being effective to direct one or more other wireless network devices in the Weave network to perform an operation based on the contents of the IPv6 data packet.

2. The method of claim 1, wherein the group identifier is a trait identifier, and wherein the trait identifier is associated with a trait in the Weave network.

3. The method of claim 1, wherein the group identifier is a resource identifier, and wherein the resource identifier is associated with a resource in the Weave network.

4. The method of claim 1, wherein the Weave network comprises:
    a wireless mesh subnetwork; and
    a Wi-Fi subnetwork.

5. The method of claim 4, wherein the IPv6 data packet is routable between the wireless mesh subnet and the Wi-Fi subnet.

6. The method of claim 4, wherein the wireless mesh network is a Thread network.

7. The method of claim 1, the method further comprising:
    setting a scop field in the destination address to a value that indicates that the destination address has a site-local scope, the value of the scop field preventing routing of the IPv6 packet outside the Weave network.

8. The method of claim 1, wherein the hashing the application group identifier to produce the group identifier comprises:
    hashing the application group identifier with a Fowler-Noll-Vo hash algorithm to produce the group identifier.

9. A method for filtering a multicast address by a wireless network device, the method comprising:
    receiving an application group identifier;
    hashing the application group identifier to generate a group identifier;
    receiving an Internet Protocol version 6 (IPv6) data packet including a multicast address over a Weave network;
    comparing a value in a group identifier field to the generated group identifier to determine if the value in a group identifier field equals the generated group identifier; and
    based on the determining that the group identifier field equals the generated group identifier, sending contents of a data field of the IPv6 data packet to an application in the wireless network device, the sending causing the application to direct the wireless network device to perform an operation.

10. The method of claim 9:
    wherein the group identifier is a trait identifier, and wherein the trait identifier is associated with a trait in the Weave network;
    wherein the group identifier is a resource identifier, and wherein the resource identifier is associated with a resource in the Weave network; or
    wherein the group identifier is an interface identifier, and wherein the interface identifier is associated with an interface in the Weave network.

11. The method of claim 9, wherein the hashing the application group identifier to produce the group identifier comprises:
    hashing the application group identifier with a Fowler-Noll-Vo hash algorithm to produce the group identifier.

12. A wireless network device comprising:
    a wireless network interface;
    a processor; and
    memory comprising instructions executable by the processor that configure the wireless network device to:
        receive an application group identifier;
        hash the application group identifier to generate a group identifier;
        concatenate a global identifier and a Weave fabric identifier;
        insert the concatenated global identifier and the Weave fabric identifier into a network prefix field of a destination address;
        insert the group identifier into a group identifier field of the destination address;
        set the value of a plen field of the destination address to a value that indicates a length of the Weave fabric identifier;
        insert the destination address into an Internet Protocol version 6 (IPv6) data packet; and
        send the IPv6 data packet over a Weave network, the sending being effective to direct one or more other wireless network devices in the Weave network to perform an operation based on the contents of the IPv6 data packet.

13. The wireless network device of claim 12, wherein the wireless network interface is a Thread network interface.

14. The wireless network device of claim 12, wherein the wireless network interface is a Wi-Fi network interface.

15. The wireless network device of claim 12, wherein the group identifier is a trait identifier, and wherein the trait identifier is associated with a trait in the Weave network.

16. The wireless network device of claim 12, wherein the group identifier is a resource identifier, and wherein the resource identifier is associated with a resource in the Weave network.

17. The wireless network device of claim 12, the instructions further executable by the processor to configure the wireless network device to:
set a scop field in the destination address to a value that indicates that the destination address has a site-local scope, the value of the scop field preventing routing of the IPv6 packet outside the Weave network.

18. A wireless network device comprising:
a wireless network interface;
a processor; and
memory comprising instructions executable by the processor that configure the wireless network device to:
receive an application group identifier;
hash the application group identifier to generate a group identifier;
receive an Internet Protocol version 6 (IPv6) data packet including a multicast address over a Weave network;
compare a value in a group identifier field to the generated group identifier to determine if the value in a group identifier field equals the generated group identifier; and
based on the determination that the group identifier field equals the generated group identifier, send contents of a data field of the IPv6 data packet to an application in the wireless network device, the sending causing the application to direct the wireless network device to perform an operation.

19. The wireless network device of claim 18:
wherein the group identifier is a trait identifier, and wherein the trait identifier is associated with a trait in the Weave network;
wherein the group identifier is a resource identifier, and wherein the resource identifier is associated with a resource in the Weave network; or
wherein the group identifier is an interface identifier, and wherein the interface identifier is associated with an interface in the Weave network.

20. The wireless network device of claim 18, wherein the instructions to hash the application group identifier to produce the group identifier are executable by the processor to configure the wireless network device to:
hash the application group identifier with a Fowler-Noll-Vo hash algorithm to produce the group identifier.

* * * * *